United States Patent [19]
Tatsuzawa

[11] 3,974,337
[45]*Aug. 10, 1976

[54] FM TELEVISION TELEPHONE SYSTEM

[75] Inventor: Yoshinobu Tatsuzawa, Kyoto, Japan

[73] Assignee: Matsushita Electric Industrial Co., Ltd., Osaka, Japan

[ * ] Notice: The portion of the term of this patent subsequent to Mar. 27, 1990, has been disclaimed.

[22] Filed: May 23, 1974

[21] Appl. No.: 472,664

Related U.S. Application Data

[60] Continuation of Ser. No. 282,860, Aug. 22, 1972, abandoned, which is a division of Ser. No. 769,051, Oct. 21, 1968, Pat. No. 3,723,653.

[30] Foreign Application Priority Data

| Oct. 24, 1967 | Japan | 42-69116 |
| Dec. 28, 1967 | Japan | 43-79 |
| Dec. 28, 1967 | Japan | 43-81 |
| Jan. 26, 1968 | Japan | 43-4728 |
| May 30, 1968 | Japan | 43-37420 |
| Aug. 8, 1968 | Japan | 43-56894 |

[52] U.S. Cl............... 179/2 TV; 178/6.8; 178/DIG. 7
[51] Int. Cl.² ............. H04M 11/00; H04N 7/10
[58] Field of Search ............ 179/2 TV; 178/DIG. 7, 178/6.8

[56] References Cited
UNITED STATES PATENTS

| 2,017,883 | 10/1935 | Zworykin | 178/6 |
| 2,314,471 | 3/1943 | Wright | 178/5.6 |
| 2,420,198 | 5/1947 | Rosenthal | 178/6.8 |
| 2,878,310 | 3/1959 | Becker | 178/6 |
| 2,895,005 | 7/1959 | Kock | 178/5.6 |
| 2,909,600 | 10/1959 | Becker | 178/6.8 |
| 2,922,843 | 1/1960 | Clark | 178/6.8 |
| 3,061,670 | 10/1962 | Oster et al. | 178/6.8 |
| 3,263,027 | 7/1966 | Beltrami | 178/6.8 |
| 3,456,206 | 7/1969 | Kwartiroff | 333/28 |
| 3,463,879 | 8/1969 | Miyashiro | 178/6.8 |
| 3,467,772 | 9/1969 | Crane | 178/6 |
| 3,482,040 | 12/1969 | Brinster | 178/6.8 |
| 3,519,744 | 7/1970 | Dorros et al. | 179/2 TV |
| 3,524,023 | 8/1970 | Whang | 179/2 DP |
| 3,530,251 | 9/1970 | Miyawaki | 179/2 TV |

FOREIGN PATENTS OR APPLICATIONS

| 121,146 | 11/1958 | U.S.S.R. | 178/DIG. 7 |

*Primary Examiner*—George G. Stellar
*Attorney, Agent, or Firm*—Stevens, Davis, Miller & Mosher

[57] ABSTRACT

A television telephone system, wherein frequency-modulation with a low modulation index is effected by using a carrier wave of a slightly higher frequency than the maximum frequency of a video signal, and the video signal thus modulated is transmitted through a transmission line. With such system, a wide band video signal and audio signal can be transmitted without cross talk and distortion by using an ordinary telephone cable which is intended to be used only for the transmission of voice frequency signals, and communication can be achieved, with the image of the opposite party or drawing, document or the like being viewed.

9 Claims, 10 Drawing Figures

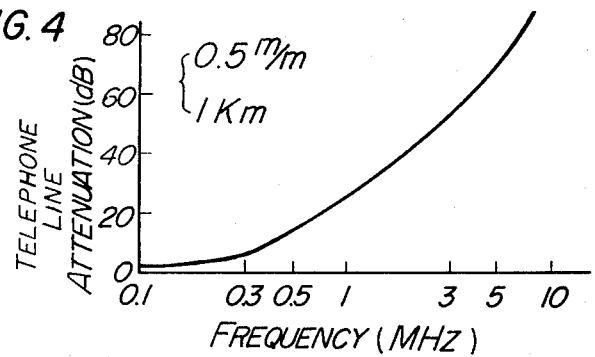
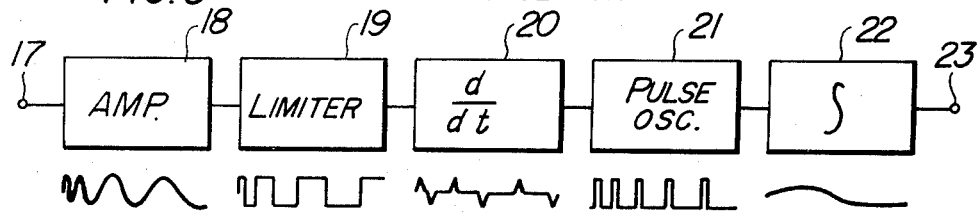
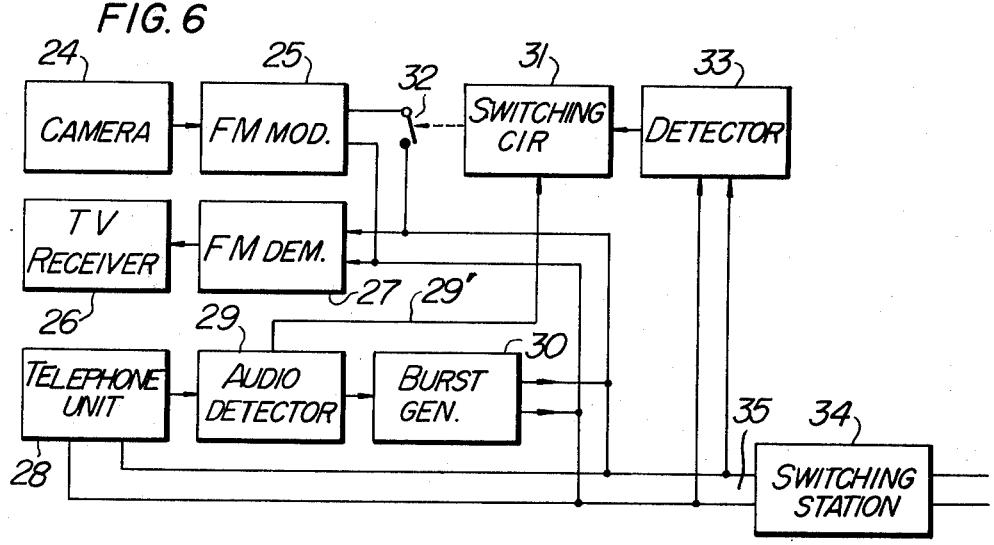

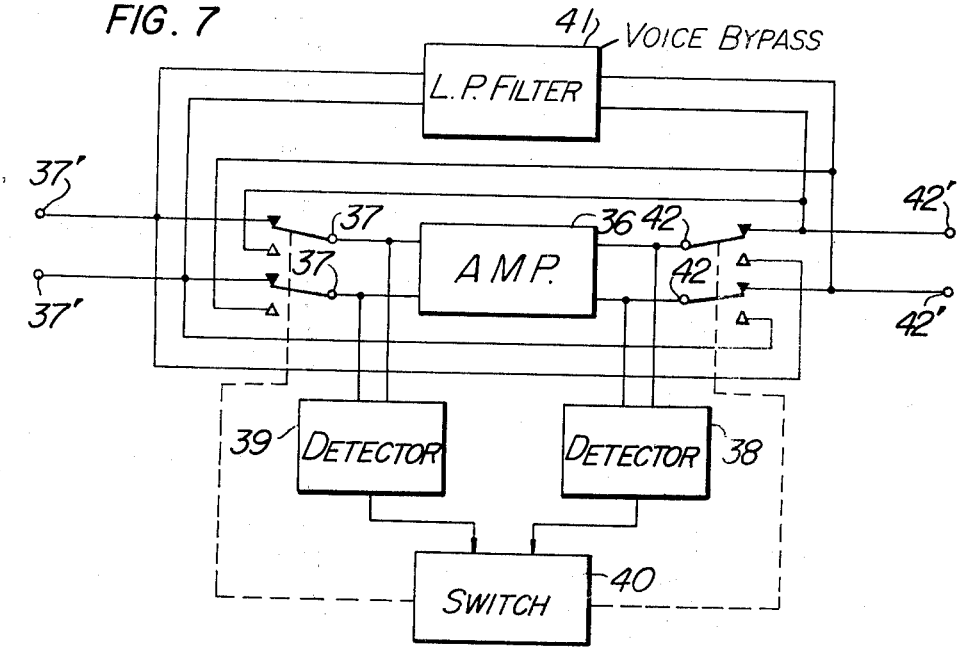
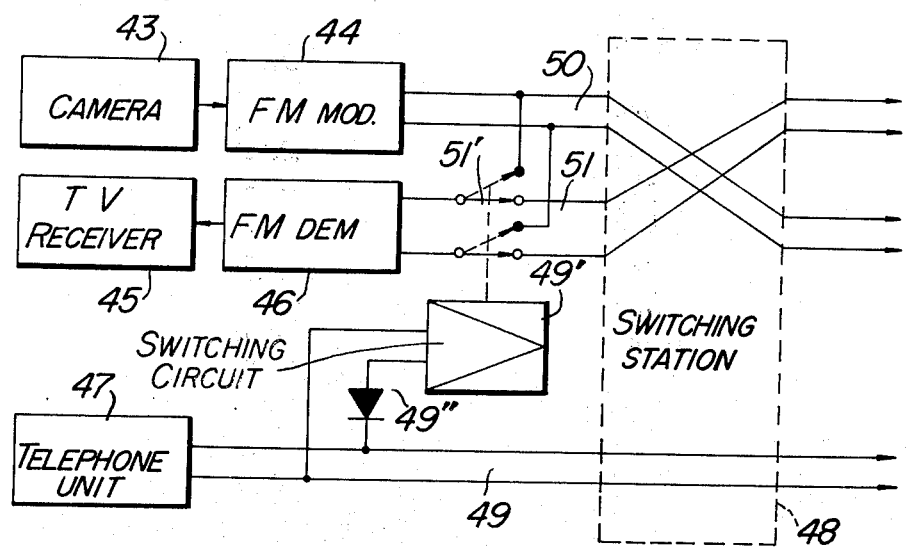

6 WIRE IN CONFERENCE ARRANGEMENT

FM TELEVISION TELEPHONE SYSTEM

This application is a continuation of U.S. Application Ser. No. 282,860, filed Aug. 22, 1972 (now abandoned), which in turn is a divisional of U.S. Application Ser. No. 769,051, filed Oct. 21, 1968, now U.S. Pat. No. 3,723,653.

This invention relates to a television telephone system, and more particularly it pertains to such system wherein frequency-modulation with a low modulation index is effected by using a carrier wave of a slightly higher frequency than the maximum frequency of a video signal, and the video signal thus modulated is transmitted through a transmission line.

It is a primary object of the present invention to make it possible to transmit wide band video signals without distortion through an ordinary telephone line which is of poor frequency characteristic or intended only for the transmission of the voice frequency signal.

Another object of the present invention is to provide a two-wire television telephone system and also a conference television telephone system utilizing such two-wire television telephone system.

A further object of the present invention is to provide a six-wire television telephone system and also a conference television telephone system utilizing such six-wire television telephone system.

A still further object of the present invention is to provide a pick-up device for documents or the like which is suited to the present television telephone system.

Other objects, features and advantages of the present invention will become apparent from the following description taken in conjunction with the accompanying drawings, in which:

FIG. 4 is a view showing the frequency characteristic of an ordinary telephone line;

FIG. 5 is a block diagram showing a demodulating circuit which can be employed in the present television telephone system;

FIG. 6 is a block diagram showing the two-wire television telephone system according to the present invention;

FIG. 7 is a circuit diagram showing a repeating amplifier to be used for long distance transmission in the present two-wire television telephone system;

FIG. 8 is a block diagram showing the six-wire television telephone system according to the present invention;

Figure 1:
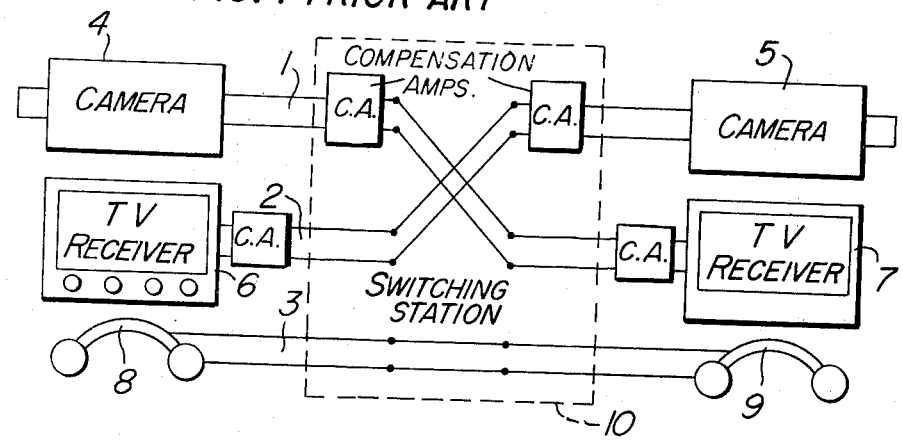
FIG. 1 is a block diagram showing the conventional television telephone system.

Referring to FIG. 1, there is shown the conventional television telephone system, which requires two pairs of wide band transmission lines 1 and 2 such as coaxial cables or high-quality telephone cables and several compensation amplifiers through which video signals are directly transmitted, and there is provided a voice channel 3 similar to that in the ordinary telephone system. Such conventional system is designed so that either a picture of high resolution such as about 3 MHz or a picture of a narrow band such as about 500 KHz might be transmitted depending upon the characteristic of the wide band transmission lines and the compensation amplifiers. The reference numerals 4 and 5 represent cameras, 6 and 7 television receivers, 8 and 9 telephone instruments, and 10 an exchange. However, the conventional system described above is disadvantageous in the facts that the coaxial cables to be used are expensive and the use of such a narrow band as about 500 KHz results in unsatisfactory picture quality. Furthermore, special compensation amplifiers are required for compensating the line characteristics in the case of long distance transmission.

An attempt has heretofore been made to transmit wide band video signals by compressing them to a narrow band, but such attempt has not yet been put to practical use since high-quality pictures cannot be reproduced even by using expensive sophisticated apparatus.

Description will now be made of the television telephone system according to the present invention.

Figure 2:
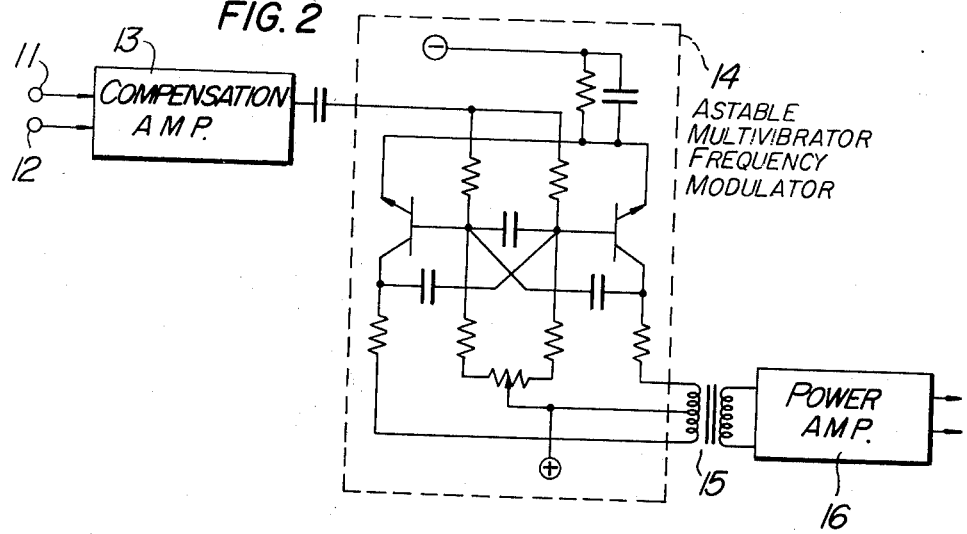
FIG. 2 is a circuit diagram showing a modulator circuit which is employed in the television telephone system according to the present invention for modulating wire band video signals.

Referring to FIG. 2, there is shown a wide band video signal modulating circuit which is used in the present system. Assume that the maximum frequency of a video signal is 3 MHz for example, then a carrier wave frequency is to be set slightly higher than the maximum frequency, e.g., 4 MHz.

The carrier wave is frequency-modulated by a video signal with a shallow frequency deviation (frequency deviation of 800 KHz, for example).

There are available two alternative methods for performing such frequency-modulation. That is, one of those methods is to produce oscillation at about 4 MHz by means of an oscillator such as an astable multivibrator and directly change the oscillation frequency by changing the parameters of the oscillator circuit in accordance with a video signal, and the other method is to frequency-modulate the oscillated signal of a high frequency produced by an oscillator using a reactance tube, variable capacitance diode or the like with a video signal, and then beat-down the modulated signal by mixing the latter with the output of a separate oscillator adapted to produce oscillation at a frequency close to that of the said oscillator. FIG. 2 shows a circuit utilizing the first-mentioned method, wherein the reference numerals 11 and 12 represent video signal input terminals, 13 a compensation amplifier, 14 an astable multivibrator, 15 an output transformer, and 16 a power amplifier.

Figure 3:
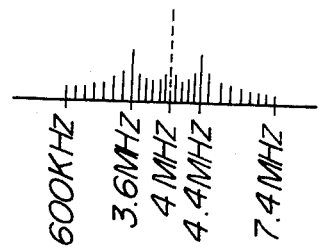
FIG. 3 shows the spectra of a signal produced by the modulating circuit shown in FIG. 2.

The substantial part of the spectra of the modulated signal obtained in the above manner cover beween about 600 KHz and 7.4 MHz, as shown in FIG. 3.

As shown in FIG. 4, the frequency characteristic of an ordinary telephone line is such that at about 4.5 MHz, the attenuation over a distance of about 1 km is about 50 to 60 dB and much greater attenuation occurs in the upper side-band (above 4.5 MHz) in the case of a longer distance.

As noted above, video signals have a frequency range between 30HZ and 4MHZ and are transmitted on a 4MHZ carrier wave frequency-modulated with a shallow frequency deviation of about ± 800 KHZ. A television signal is generally non-symmetric, i.e., the frequency components are not uniform; hence, its spectrum is not simple but complex. In the transmission and demodulation of the video signals over telephone lines according to the system of this invention, the frequency components above 4.8MHZ are attentuated and only the frequency components from 600KHZ to 4.8MHZ are transmitted and demodulated through a limiter. The relatively lower frequency components of the video signal are demodulated without distortion as in the case of ordinary frequency modulation since both side-band waves are transmitted and the modulation index is high. In a television signal, the frequency components below 400KHZ generally have a large amplitude, upon which the signal to noise ratio primarily depends. The higher frequency components above 1MHZ are normally low in amplitude and have a low modulation index. In this case, the modulated signal is demodulated in the manner shown in the following mathematical analysis.

Assuming that a modulation signal is represented by $\sin pt$, the frequency-modulated wave $S(t)$ is expressed as:

$$S(t) = \cos(\omega t + \beta \sin pt) \qquad (1)$$

Where $\beta = \Delta\omega/p$  $\Delta\omega$: deviation

By expanding equation (1) in a Bessel function $$S(t) = J_0(\beta)\cos\omega t + J_1(\beta)\cos(\omega+p)t - J_1(\beta)\cos(\omega-p)t + J_2(\beta)\cos(\omega+2p)t - J_2(\beta)\cos(\omega-2p)t + \ldots \qquad (2)$$

(See Lathi, *Signals, Systems and Communication*, John Wiley & Sons, Inc., 1965, pp. 494–499.)

Now when the modulation index is low, and thus the upper side-band wave can be ignored, the input of the demodulation is expressed as:

$$S^*(t) = J_0(\beta)\cos\omega t - J_1(\beta)\cos(\omega-p)t$$
$$= |S^*(t)| \left[\cos\omega t - \tan^{-1}\frac{J_1(\beta)\sin pt}{J_0(\beta) - J_1(\beta)\cos pt}\right] \qquad (3)$$

By passing the frequency-modulated signal through an amplitude limiter (e.g. limiter 19) the amplitude term in equation (3) can be ignored as a unit. Furthermore, in the case where $J_1(\beta)/J_0(\beta) \ll 1$, since $\beta$ is small the following relation is derived:

$$\tan^{-1}\frac{J_1(\beta)\sin pt}{J_0(\beta) - J_1(\beta)\cos pt} \approx \frac{J_1(\beta)}{J_0(\beta)}\sin pt \approx \frac{\beta}{2}\sin pt \qquad (4)$$

Therefore, the equation (3) can be approximated by $$S^*(t) = J_0\left(\frac{\beta}{2}\right)\cos\omega t + J_1\left(\frac{\beta}{2}\right)\cos(\omega+p)t - J_1\left(\frac{\beta}{2}\right)\cos(\omega-p)t \qquad (5)$$

Thus the higher frequency components of a video signal to be transmitted are demodulated through a discriminator, having half their original amplitude. Accordingly, if the higher frequency components of this video signal are pre-emphasized in amplifier 13 before a carrier is frequency-modulated thereby, these components can also be reproduced satisfactorily.

It should be noted that higher frequency components of a video signal are contained in both the upper and lower sidebands of a video signal frequency-modulated carrier. Furthermore, the pre-emphasis of the higher components of the video signal to be transmitted is not always necessary at the transmitting end and instead the higher components may be compensated by appropriately amplifying frequency components of a video signal which are discriminated at the receiving end.

The upper side-band of a modulated carrier can therefore be recreated or reproduced by an amplitude limiter, which inherently has a non-linear detecting characteristic in addition to the amplitude limiting function, by transmitting only a carrier and the lower side-band of the modulated carrier to the receiving end. (See equation (5), where $\omega$ represents the angular frequency of the carrier.)

Thus, in the system of this invention, where the upper side-band of a video signal frequency-modulated carrier wave is not substantially transmittable due to the frequency characteristic of a telephone transmission line, it is not necessary that it be transmitted since it can be reproduced as a result of interaction of the transmitted carrier and lower side-band of the modulated carrier along with the non-linear characteristic of the amplitude limiter. Also, the limiter simultaneously compensates for irregularities in frequency of the transmission line.

Accordingly, in frequency-modulating a carrier wave, which has a slightly higher frequency than the maximum frequency of a video signal to be transmitted, with the video signal having a low index of modulation, no function is necessary wherein the amplitude of the upper side-band portion is increased relative to the lower side-band portion.

Generally, it has been known to those skilled in the art that an amplitude limiter exhibits a non-linear detection characteristic relative to a combination of incoming singals ($\cos\omega t$, $\cos(\omega-p)t$). Accordingly it will be seen that if a carrier $J_0(\beta)\cos\omega t$ and the lower side-band $-J_1(\beta)\cos(\omega-p)t$ of the modulated carrier are passed through an amplitude limiter in a suitable manner [equation (3)], the upper side-band wave $J_1(\beta/2)\cos(\omega+p)t$ in addition to the carrier wave $J_0(\beta/2)\cos\omega t$ and the lower side-band $-J_1(\beta/2)\cos(\omega-p)t$ is detected or reproduced at the output side [equation (5)]. Finally, it should be noted that the frequency-modulated signal expressed by equation (3) does not contain the term of the upper side-band before passing the frequency-modulated signal through the limiter.

An example of a demodulator circuit is shown in FIG. 5, wherein the reference numeral 17 represents an input terminal, 18 an amplifier with 50 dB of gain, 19 a limiting amplifier (limiter), 20 a differentiating circuit, 21 a pulse generator, 22 an integrating circuit, and 23 a video signal output terminal. A signal amplified by the amplifier 18 is converted to a rectangular wave by the limiter 19, and then differentiated by the differentiating circuit 20, the output of which is used as a triggering signal to control the pulse generator in order to produce constant-amplitude pulses, which are in turn integrated for demodulation. Another method is to effect demodulation by beating up a signal to a higher frequency and then passing it through an ordinary discriminator. Such a video signal transmission method has the following features:

1. In the case of the foregoing example, the spectral frequency band below 600 KHz is unoccupied so that other types of signals such as voice signal, dial tone, control signal, facsimile signal, data signal and so forth can be simultaneously transmitted through the common line while being superimposed upon a video signal.

2. Low-frequency induction noise or the like has no effect on the picture quality.

3. The contrast of a reproduced picture is not varied with a change of level occurring depending upon the transmission distance.

4. The contrast remains unchanged irrespective of level change stemming from the simultaneous connection of a multiplicity of receivers.

5. The picture quality remains unchanged irrespective of variations in the line characteristics with temperature variations.

6. The repeating amplifier can be simplified since the frequency characteristic is not critical.

Description will now be made of the two-wire television telephone system using the aforementioned modulation system, the concrete arrangement of which is as shown in FIG. 6, wherein the reference numeral 24 represents a camera, 25 a frequency-modulator connected with the camera 24, 26 a television receiver, 27 a frequency-demodulator for the receiver 26, 28 a telephone instrument, 29 a voice detector for detecting a voice signal occurring in the telephone instrument 28, 30 a burst generator for generating a burst signal of e.g., 30 KHz, 31 a switching circuit for controlling the switching operation of a switch 32, and 33 a detector circuit for detecting the burst signal of the said 30 KHz contained in a signal from an exchange 34 and controlling said switching circuit 31 to turn off in accordance with the detection signal. A signal entering the switching circuit 31 through a line 29' restrains the circuit 31 from being operated by a signal resulting from the detection of the output of the burst generator 30 by the burst detector, and it also serves to turn on the switch 32 when the latter is in the "off" state. Individual subscribers are connected with each other through two-wire telephone cable 35 as the case with the oridinary telephone system.

Voice and dial signals from the telephone instrument 28 are directly supplied to the exchange 34 as usual, and a video signal representing an image picked up by the camera 24 is modulated by the FM modulator 25 in the aforementioned manner and then superimposed upon the voice signal. Such video signal is transmitted only in one direction under the action of the switch 32. That is, the design is made such that the image of a speaker appears on the television receiver 26 of the other party when he speaks. At that time, the switch 32 in the speaker's apparatus is turned on, while the switch 32 in the other party's apparatus is turned off. That is, a voice signal is rectified and integrated in the voice detector 29 to produce a triggering signal at the beginning of a phrase, so that a tone burst durable for about 100 miliseconds (the frequency is 30 KHz, for example) is generated by the burst generator 30. This tone burst is transmitted to the other party so that the output of the video modulator in the other party's apparatus is cut off while the output of the video modulator 25 in the speaker's apparatus is turned on. In this case, the switching circuit 31 in the speaker's apparatus is inhibited. Consequently, the speaker is viewed on the other party's receiver until the other party speaks. With such arrangement, it is possible to achieve the purpose of television telephone substantially satisfactorily.

In an attempt to utilize the present system as conference system, the intended purpose can be achieved merely by connecting a plurality of subscribers in parallel with each other. In this case, the image of a speaker is simultaneously viewed on all the television receivers, and upon alternation of speaker, the image viewed on the respective receivers is changed at the same time. Of course, the voice can be communicated to all the parties.

In either case, when a speaker takes off the receiver, a triggering signal is generated due to the shock of the power source so that the change-over switch 32 in the speaker's apparatus is turned on, when powers are supplied to the camera 24 and television receiver 26. Thus, the image of the speaker is viewed on his receiver. (In this case, the filaments in the camera 24 and television receiver 26 are pre-heated by weak power when the circuit is cut off.) When the other party responds to the dialing of the telephone instrument 28, trigger and tone burst are produced due to the shock of the power source in the other party's apparatus, so that the image viewed on the screen is changed to that of the other party. Subsequent alternation of image is effected by voice signal.

In the case of a two-wire system, repeating amplifiers are inserted to achieve long distance transmission. In such case, however, it is necessary that the directionality of the input and output terminals of the repeating amplifiers be switched in correspondence with the direction of the video signal transmission. This can be achieved by discriminating the in-coming direction of the 30 KHz tone burst by means of a direction discriminator. FIG. 7 shows the circuit arrangement of a repeater including such direction discriminator, wherein amplifier 36 is so designed as to amplify only the frequency band above 30 KHz. When the 30 KHz tone burst appears at terminals 42', 42 of the amplifier 36, the 30 KHz detector 38 provides an output while the other 30 KHz detector 39 provides no output. At this point, the switching circuit 40 is quickly operated to reverse the polarity of the amplifier 36 and connect the terminals 37' and 42' with the terminals 42 and 37 respectively. When the 30 KHz signal is detected at the terminals of the 30 KHz detectors 38 and 39, the switching circuit 40 is prevented from being operated. Further, voice and dial signals are not passed through the amplifier 36 but by-passed through a 4 KHz low-pass filter 41.

Next, description will be made of the six-wire television telephone system according to the present invention, which is advantageous in the fact that the image of the opposite party can be viewed irrespective of the speaker.

The concrete arrangement of such system is as shown in FIG. 8, wherein the reference numeral 43 represents a camera, 44 an FM modulator, 45 a television receiver, and 46 an FM demodulator. With this arrangement, too, the aforementioned modulation and demodulation are effected. The reference numeral 47 denotes a telephone instrument, 48 an exchange, and 49' a switching circuit. A voice channel 49, transmission channel 50 and reception channel 51 are independently provided, and therefore six wires are needed.

Such six-wire system has such advantages that near-end cross talk can be reduced by separately bundling the transmission lines and reception lines and there is no need to switch the repeating amplifier.

By maintaining under -30 dB cross talk level between transmission and reception signals, it is possible to obtain sufficient practical S/N ratio. Such a value can easily be realized by designing the transmission line in such a manner as to improve the degree of balance of installation thereof.

Figure 9:
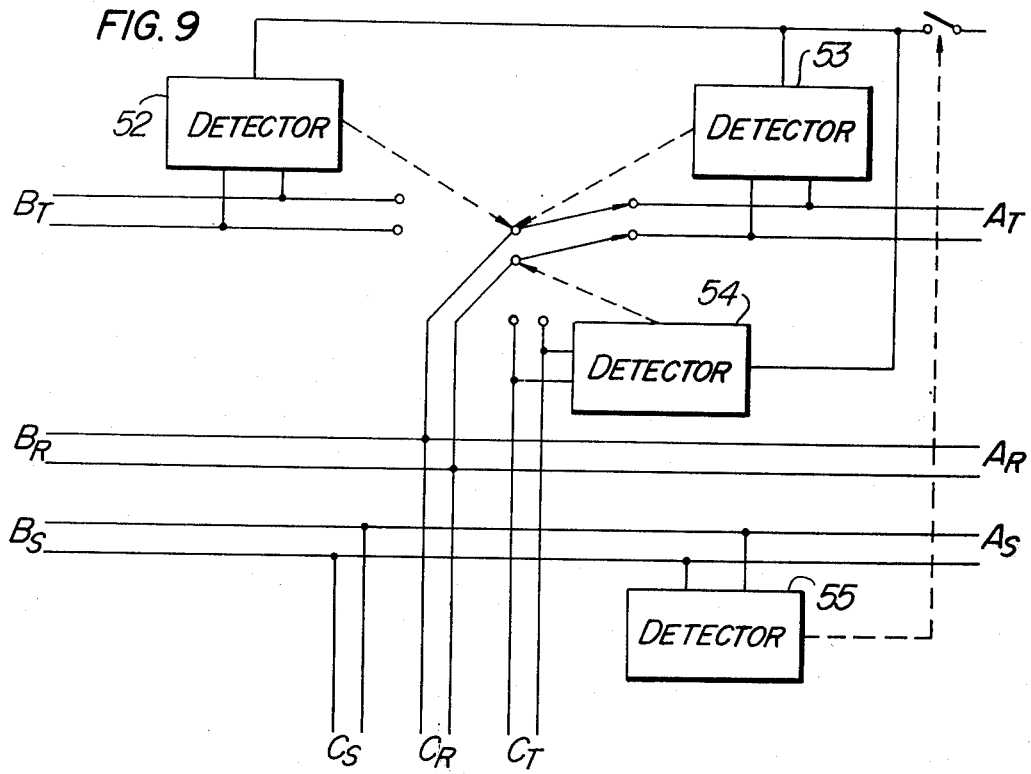
FIG. 9 is a circuit diagram showing the system of FIG. 8 as being constructed in the form of conference system.

FIG. 9 shows an arrangement for achieving conference communications in accordance with the six-wire system, wherein A, B and C represent the respective subscriber stations, with the suffix T indicating video transmission, R video reception and S sound. The voice line and video reception lines are connected in parallel with each other. A video transmission line is connected with a video reception line by selecting one circuit associated with a caller in the exchange. That is, in each of the subscriber stations, A, B and C, a tone burst of 30 KHz for example is produced by detecting the beginning of a word so as to be transmitted to the video transmission line. Upon detection of such tone burst, the exchange connects only one circuit and disconnects all the other circuits. The reference numerals 52, 53, 54 and 55 denote 30 KHz detectors respectively. The broken arrows show the control systems.

It may sometimes be desired that the voice switching operation be interrupted and that the same image be continuously viewed. This can be achieved by continuously sending a 30 KHz tone signal to the voice circuit (or video receiver circuit). In the exchange, such tone signal is detected, and the voice switching circuit is cut off, so that the present connection is maintained. The circuit arrangement needed to achieve this purpose is also shown in FIG. 9. That is, the above function is achieved by 30 KHz detector 55.

In both cases of the aforementioned bilateral communications and conference communications, when the handset is taken off at one station, the image of the caller is first viewed, but when the dialing operation is completed and the opposite party responds to the call, the image is changed to that of the called party. To this end, the exchange is afforded such a function as to reverse the polarity of the power source connected with the voice circuit when connection is made. At each terminal, the polarity of the voice circuit is detected to change the connection, so that the image of the caller initially viewed is changed to that of the opposite party. That is, diode 49'' is controlled to be rendered conductive or non-conductive in accordance with the polarity of the power source for the voice circuit 49, so that the operation of the change-over circuit 49' such for example as a relay is controlled to thereby control the change-over of a switch 51', as shown in FIG. 8.

For conference communications, one 30 KHz tone burst is produced simultaneously with a "hook-off" in order that the images of conference participators may be successively viewed by all of them. A concrete circuit arrangement for achieving such purpose will readily become apparent to those skilled in the art. Preferably, the heaters of cameras and TV tubes are pre-heated to cause an image to be quickly viewed by turning on the power source concurrently with the "hook-off". At each equipment, the image can freely be changed to the image of the subscriber, as desired.

Description will now be made for viewing documents, drawings and so forth in the television telephone system.

Figure 10:
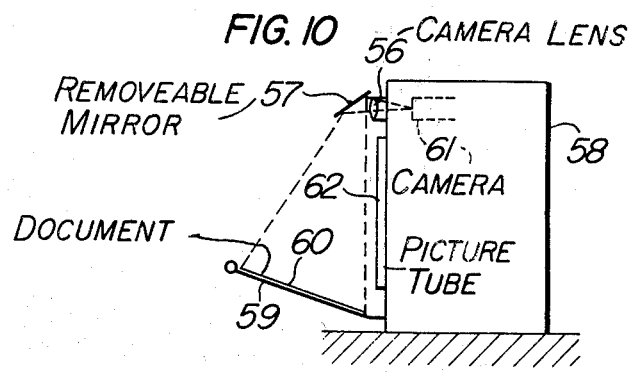
FIG. 10 is a schematic view showing a television telephone instrument which can be used in the present television telephone system.

As shown in FIG. 10, a removable a mirror 57 is mounted in front of a camera lens 56 at an angle of about 45° with respect to the optical axis of the lens. In case the image of a man or figure is to be viewed, the mirror 57 is accommodated in a casing 58, and in case a document is to be viewed, the mirror 57 is taken out so that the image of document 60 placed on a lower plate 59 is reflected by the mirror so as to be projected onto a camera 61. In this case, the viewed image of the document 60 tends to be bilaterally reversed. Therefore, the scanning direction of the pick-up tube 61 is also reversed in interlocking relationship with the operation of taking out the mirror 57.

Furthermore, the focal distance differs between the case where a document is viewed and the case where a figure is viewed, and therefore the focus of the camera 61 is adjusted in interlocking relationship with the operation of taking out the mirror, so that the focal point is located at the plate 59.

From the standpoint of television telephone instrument design, a difficulty is often encountered in taking out the mirror to position the mirror so that it is located above the center of a document as shown in FIG. 10. Thus, there is a tendency that the viewed image of a document placed on a desk is enlarged at the bottom or distorted to be trapezoidal. Such trapezoidal distortion can be corrected by inclining the document plate 59 as shown in FIG. 10. The reference numeral 62 represents a picture tube.

What is claimed is:

1. A television-telephone system, comprising, in combination: a conventional telephone transmission line having a narrow band transmission characteristic; means for generating a video signal; means for generating a carrier wave signal having a frequency higher than and close to the maximum frequency of said video signal; means for frequency modulating said carrier wave by said video signal with a low index of modulation, such that the upper sideband portion of the modulated carrier is substantially the only portion of said modulated carrier wave which is not transmittable through said transmission line; means for transmitting said modulated carrier wave through said transmission line, except for said upper side-band portion; and frequency demodulating means, including non-linear amplitude limiting means for reproducing said upper sideband and for compensating for irregularities in the frequency characteristics of said transmission line and means for demodulating said transmitted modulated carrier wave with said reproduced upper side-band, whereby said video signal is transmitted through and reproduced from said conventional narrow band telephone transmission line.

2. A system according to claim 1, further comprising a mirror retractably disposed at an angle of approximately 45° with respect to the optical axis of a lens of a camera of said system, and a document rack mounted obliquely with respect to the bottom surface of a housing therefor.

3. A system according to claim 1, further comprising separate 2-wire telephone cables for each of two directions of transmission and reception of said video information and a further 2-wire line for a voice signal.

4. A system according to claim 3, wherein the video reception and voice lines of at least three television-telephone instruments are connected in parallel with each other; and wherein one of said video transmission lines is connected with said video reception lines by a switching signal derived from said voice signal.

5. A system according to claim 4, further comprising means suppressing the switching function of said switching signal, said suppression means including a continuous tone signal.

6. A system according to claim 1, further comprising at least one 2-wire telephone cable transmitting said frequency modulated carrier wave commonly with a voice signal.

7. A system according to claim 6, further comprising means to reverse the direction of transmission of said video information in said at least one 2-wire telephone cable, including means deriving a switching signal from said voice signal.

8. A system according to claim 7, further comprising a transmission amplifier inserted into said 2-wire telephone cable, said amplifier including means responsive to said switching signal to reverse the amplification direction of said amplifier.

9. A system according to claim 7, further comprising at least three television-telephone instruments connected in parallel with each other and means transmitting a video signal only from an instrument from which a voice signal is being simultaneously transmitted.

* * * * *